(12) United States Patent
Heil

(10) Patent No.: US 6,644,337 B2
(45) Date of Patent: Nov. 11, 2003

(54) DAMPER ASSEMBLY HAVING IMPROVED STRENGTH CHARACTERISTICS

(75) Inventor: Eugene Heil, Marathon, WI (US)

(73) Assignee: Greenheck Fan Corporation, Schofield, WI (US)

( * ) Notice: Subject to any disclaimer, the term of this patent is extended or adjusted under 35 U.S.C. 154(b) by 12 days.

(21) Appl. No.: 09/892,091

(22) Filed: Jun. 26, 2001

(65) Prior Publication Data

US 2002/0195140 A1 Dec. 26, 2002

(51) Int. Cl.$^7$ .............................................. F16K 17/38
(52) U.S. Cl. ........................................... 137/75; 137/80
(58) Field of Search .............................. 137/74, 75, 79, 137/80; 454/257, 369

(56) References Cited

U.S. PATENT DOCUMENTS

| 4,263,930 A | 4/1981 | McCabe |
| 4,295,486 A | 10/1981 | McCabe |
| 4,366,830 A | 1/1983 | Becelaere |
| 4,936,287 A | 6/1990 | Hart et al. |

*Primary Examiner*—John Rivell
(74) *Attorney, Agent, or Firm*—Quarles & Brady LLP

(57) ABSTRACT

A damper assembly is provided having a fusible link assembly including an outer housing member and an inner channel member having side walls that are fused to the outer housing. A pair of damper arms are pivotally connected to a mounting bracket at a pivot location, and are supported by the fusible link assembly at a support location. The distance between the pivot location and support location is greater than $3/8$ inch.

23 Claims, 3 Drawing Sheets

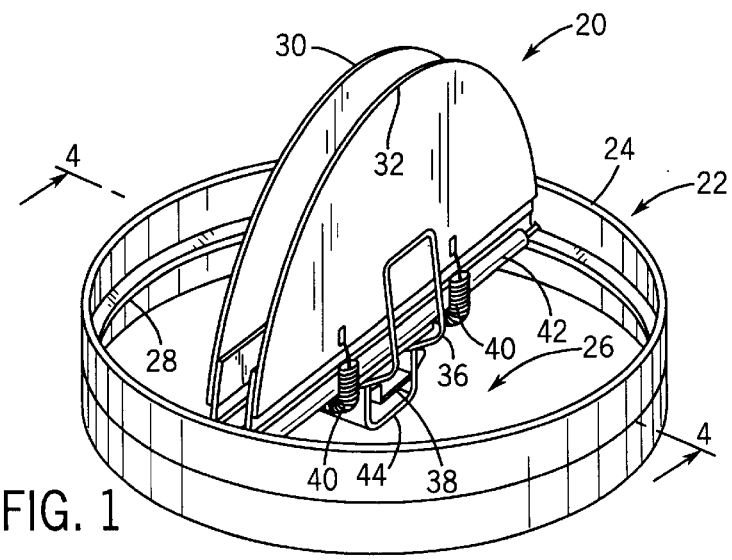
FIG. 1
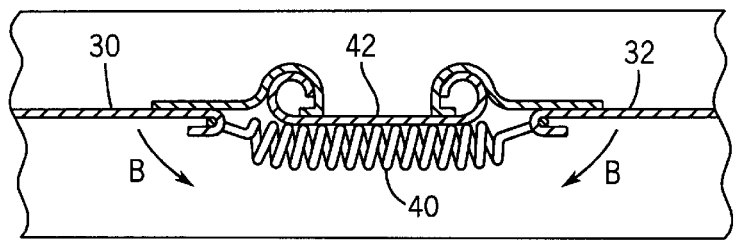
FIG. 6
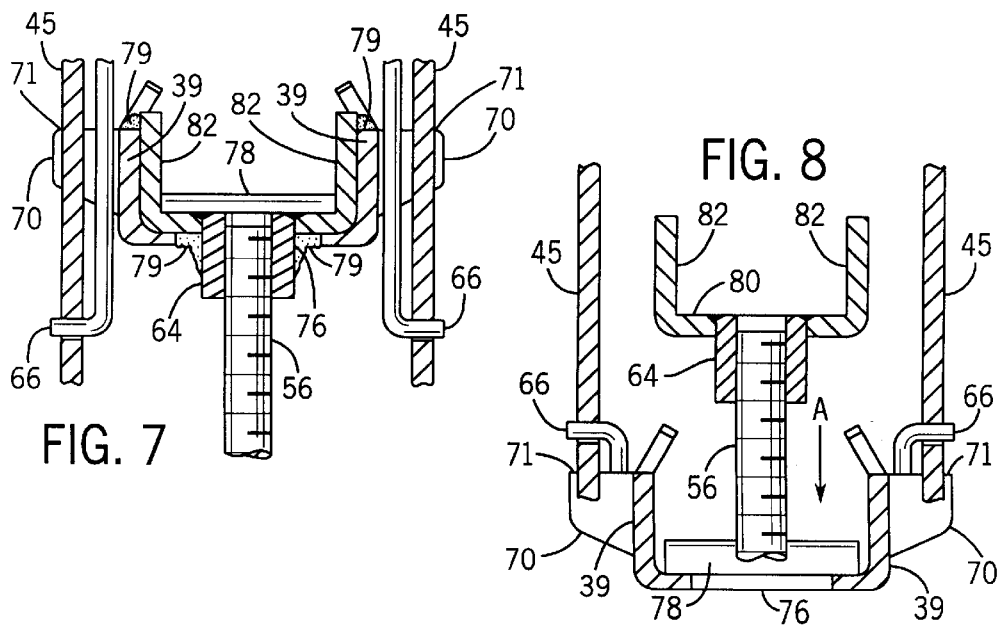
FIG. 7
FIG. 8

U.S. Patent	Nov. 11, 2003	Sheet 3 of 3	US 6,644,337 B2
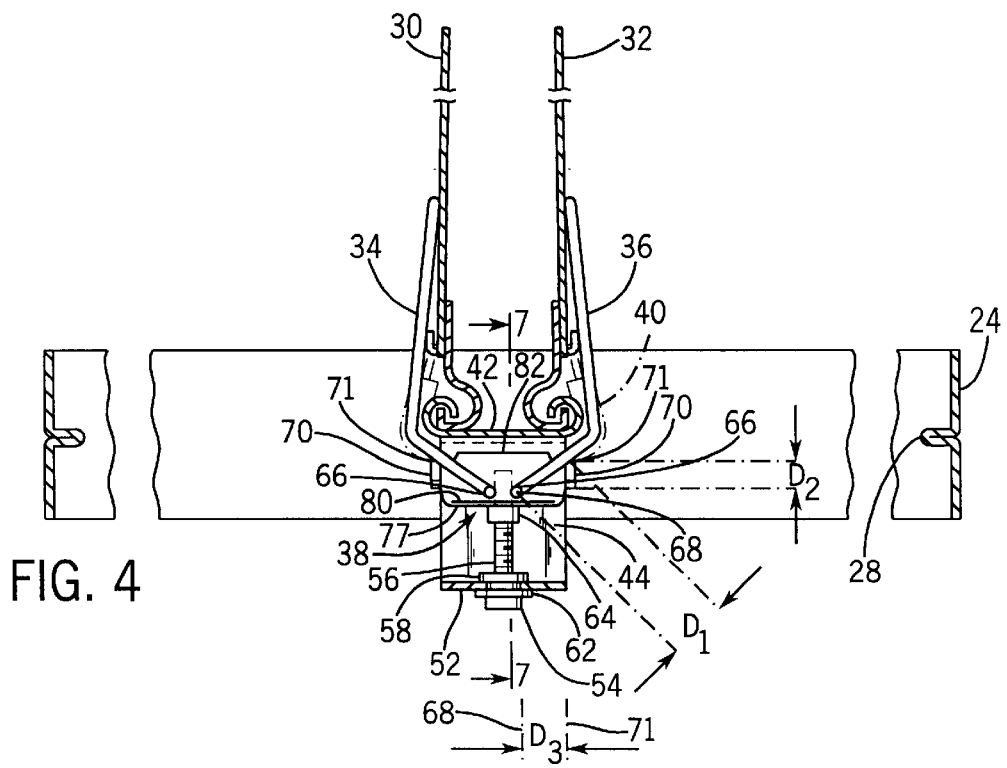

DAMPER ASSEMBLY HAVING IMPROVED STRENGTH CHARACTERISTICS

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates generally to ceiling dampers, and in particular, relates to a ceiling damper having an improved fusible link assembly and pivot arm geometry to produce enhanced strength characteristics.

Building and fire codes require that fire dampers be placed in specified heating, ventilation, and air conditioning ducts. Dampers operate in a normally open position, which allows air to flow through the ductwork, and close in response to a predetermined stimulus, such as a dramatic increase in temperature, indicating a fire or other hazardous condition. In particular, conventional dampers include a pair of damper blades that are held open by a fusible link. When the fusible link fails in a predetermined manner in response to the elevation in temperature, the mechanical interference maintaining the blades in their open position is removed, thereby permitting the damper to close and form a seal with the duct. As a result, air is prevented from circulating throughout the building in response to a fire or other hazardous condition.

One such conventional damper assembly, described in U.S. Pat. No. 4,366,830, includes a pair of damper blades that are joined together by a hinge member that allows the blades to close under the biasing force of a spring member. A pair of damper arms support the blades in their open position against the spring force, and are pivotally connected to the side walls of a mounting bracket. In particular, the terminal ends of the damper arms are inserted in to apertures extending through the side walls at a pivot location. A flat retainer plate is mechanically connected to the outer surface of the base of the mounting bracket via an axially extending screw. The retainer plate is further soldered to the upper surface of the base of an outer housing. The outer housing encases the mounting bracket and includes a pair of side walls that support the damper arms at a support location. When the solder melts in response to an elevation in temperature, the bracket and damper arms translate axially upwardly with respect to the housing, thereby removing the housing from interference with the damper arms. The damper arms therefore close under the basing spring force, which correspondingly closes the damper blades.

This design incorporates strength deficiencies in several respects. To begin, the distance between the pivot point and the support location as measured in the axial direction is no greater than $\frac{3}{8}$ inch. A significant force is thereby imparted onto the damper arms, which may fail prematurely as a result. Accordingly, the blades may close in an unreliable manner during normal operation. Additionally, because the arms are supported by the outer housing, which is soldered to the retainer plate, the force imparted onto the damper arms is transferred to the housing, and thus to the retainer plate. Testing has indicated that the retainer plate may warp due to the resulting stresses experienced during normal operation. This may crack the solder joint, and cause the damper assembly to fail prematurely.

What is therefore needed is a damper assembly having improved strength characteristics to minimize the stress experienced by the pivot arms as well as the support members so as to prevent the damper from closing prematurely.

BRIEF SUMMARY OF THE INVENTION

The present invention recognizes that conventional ceiling dampers may be modified to enhance their strength characteristics, thereby minimizing the risk of premature failure.

In accordance with one aspect of the invention, a damper assembly is disclosed having at least one damper blade operating between an open and closed position to control fluid flow through a conduit. The damper assembly comprises a bracket defining a base and a first and second oppositely disposed side walls extending upwardly therefrom. A damper arm supports the at least one damper blade and has terminal ends connected to the side walls at a pivot location to permit the arm to rotate between an open and a closed position. A fusible link assembly is coupled to the bracket and includes a housing member defining a support structure that engages the damper arm at a support location and interferes with the rotation of the damper arm, and a channel member removably fused to the housing member via a fusible link. The channel member includes a base and first and second side walls extending upwardly therefrom, wherein the channel member separates from the housing member when the fusible link reaches a predetermined temperature. The interference between the support location and the damper arm is removed when the channel member separates from the housing member to allow the damper arm to pivot about the pivot location and close the at least one damper blade.

In accordance with another aspect of the invention, the pivot location and support location define an axial distance therebetween of greater than $\frac{3}{8}$ inch.

This and other aspects of the invention are not intended to define the scope of the invention for which purpose claims are provided. In the following description, reference is made to the accompanying drawings, which form a part hereof, and in which there is shown by way of illustration, and not limitation, a preferred embodiment of the invention. Such embodiment also does not define the scope of the invention and reference must therefore be made to the claims for this purpose.

BRIEF DESCRIPTION OF THE DRAWINGS

Reference is hereby made to the following drawings in which like reference numerals correspond to like elements throughout, and in which:

FIG. 1 is a perspective view of a damper assembly constructed in accordance with the preferred embodiment;

FIG. 4 is a sectional side elevation view of the damper assembly illustrated in FIG. 1 taken along lines 4—4;

FIG. 5 is a side elevation view of the damper assembly illustrated in FIG. 1 disposed in its closed position;

FIG. 6 is a partial sectional side elevation view of the damper assembly illustrated in FIG. 5 showing a spring that biases the damper assembly towards its closed position;

FIG. 7 is a sectional side elevation view of the damper assembly illustrated in FIG. 4 taken along lines 7—7;

FIG. 8 is a sectional side elevation view of the damper assembly illustrated in FIG. 5 taken along line 8—8; and FIG. 9 is a schematic diagram illustrating the forces imparted onto the damper arms in accordance with the preferred embodiment.

DETAILED DESCRIPTION OF THE PREFERRED EMBODIMENT

Figure 2:
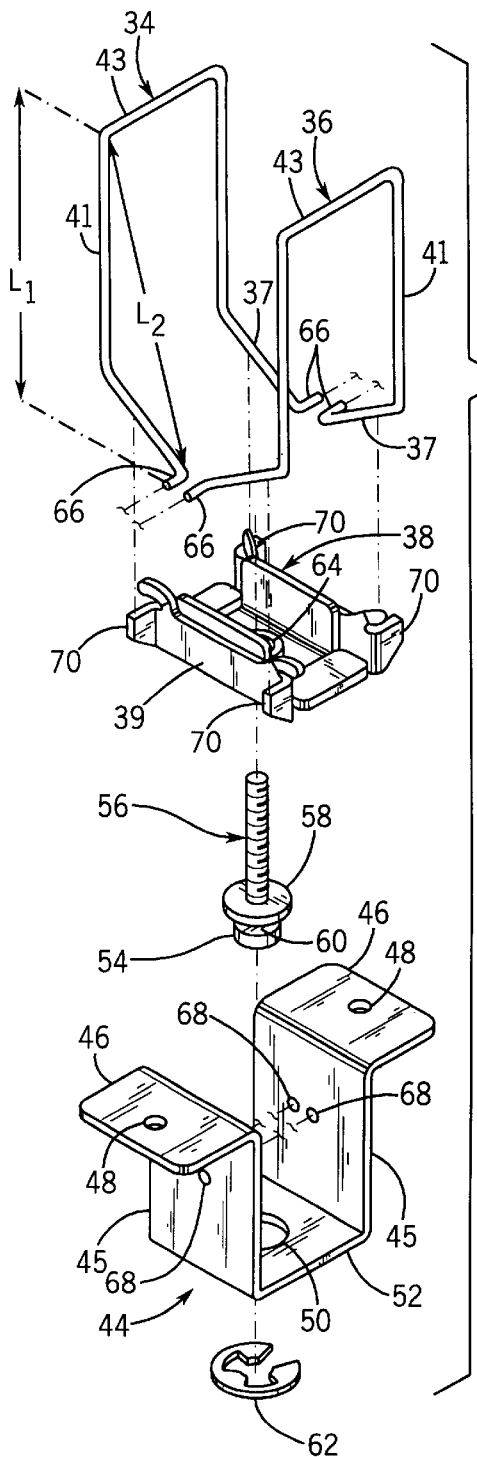
FIG. 2 is an exploded assembly view of the damper assembly illustrated in FIG. 1.

Referring initially to FIG. 1, a damper assembly 20 is installed in an annular frame 22 having a side wall 24 that defines a circular opening 26 within a conduit, such as the ductwork of a building. The damper assembly 20 includes first and second damper blades 30 and 32 that are hingedly connected to a crossbar 42 extending across and bisecting opening 26. A pair of damper arms 34 and 36 are supported in part by mechanical interference with a fusible link assembly 38, and in turn, support damper blades 30 and 32 and maintain damper assembly 20 in its open position. Accordingly, while the blades are open, in their upright position as illustrated in FIG. 1, fluid is permitted to pass unobstructed through opening 26.

A pair of springs 40 are connected at their terminal ends to the outer surfaces of blades 30 and 32 and extend around the crossbar 42, thereby providing a force that biases the blades toward a closed position, as shown in FIG. 6. As discussed above, this biasing force is countered by the fusible link assembly 38. However, when the fusible link assembly 38 fails in a predetermined manner in response to a predetermined stimulus, as will be described in more detail below, the blades swing outwardly to a closed position as illustrated in FIG. 5. An annular flange 28 extends radially inwardly from the inner surface of circular side wall 24 and provides a seat for the damper blades 30 and 32 when they are biased to their closed positions. A seal is thus formed between the outer periphery of the blades and flange 28, thereby preventing fluid flow through opening 26. Accordingly, when the damper assembly 20 is closed, air is prevented from traveling through the duct work of a building, thereby providing a blockage to smoke, toxic gases, and heat that are typically produced during a fire.

Referring now to FIGS. 4 and 5, and as will be described in more detail below, the damper assembly is illustrated in its open and closed position, respectively, in which fusible link assembly 38 includes flanges 70 that extend outwardly to engage the damper arms 34 and 36. Referring to FIG. 4 in particular, the mechanical interference between flanges 70 and the damper arms 34 and 36 resist the biasing force of springs 40 to retain the arms in their open position. The fusible link assembly 38 is retained in engagement with the arms 34 and 36 via a screw 56 that extends from a mounting bracket 44 through the hub 64 of the fusible link assembly. Referring to FIG. 5, in response to a predetermined temperature elevation, the fusible link separates into a separate inner channel member 72 and outer housing member 74. Flanges 70 extend from the outer housing member 74 which slides axially along screw 56 to remove the engagement between the flanges and arms 34 and 36. In particular, arms 34 and 36 pivot about terminal ends 66 that are disposed in pivot locations, as will be described below. Accordingly, as the arms 34 and 36 pivot, they ride along flanges 70 as the force of springs 40 biases the arms and damper blades 30 and 32 outwardly to their closed position in which the blades rest against flange 28.

Referring to FIG. 2, the components of damper assembly 20 will be described in detail. In particular, the mounting bracket 44 is a U-shaped member including a base 52 and a pair of side walls 45 extends upwardly from opposing edges of the base 52. Flanges 46 extend outwardly from the upper edge of each side wall 45. The bracket 44 is riveted to the lower surface of crossbar 42 (shown in FIGS. 1 and 6) via apertures 48 that extend through the pair of flanges 46. A hole 50 extends through the base 52 of bracket 44, and is sized to receive the head 54 of a screw 56. In particular, screw 56 includes a round plate 58 that is disposed inwardly of the head 54. Plate 58 has a diameter greater than the diameter of hole 50 such that it rests against the inner surface of base 52 when the head is inserted into hole 50 such that the screw extends axially upwardly from the base 52. A recess 60 circumscribes the outer periphery of the head 54 and is spaced axially from the plate 58 a distance greater than the thickness of base 52 such that it is exposed beneath the plate once the screw 56 is inserted into hole 50. A collar 62 is snapped into place in the recess 60 and, in combination with plate 58, prevents axial movement of the screw 56 with respect to bracket 44. The screw 56 is, however, rotatable within aperture 50.

Figure 3:
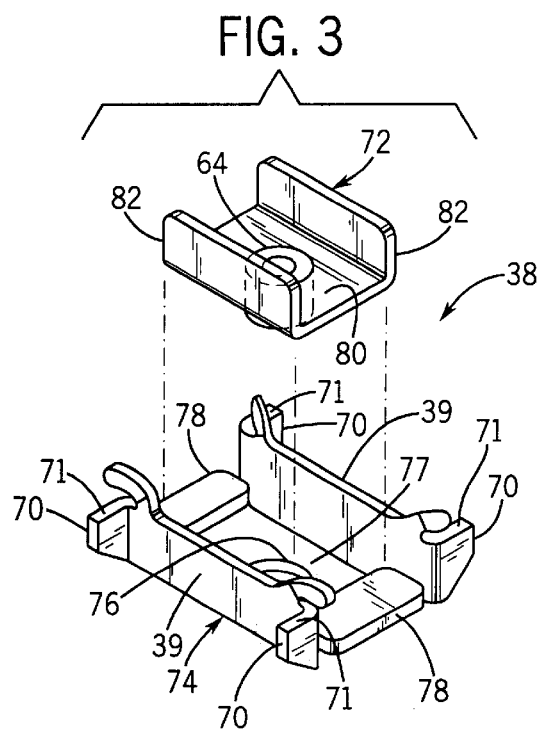
FIG. 3 is an exploded assembly view of a fusible link assembly forming part of the damper assembly illustrated in FIG. 2.

Referring now also to FIG. 3, damper assembly 20 further includes a fusible link assembly 38 comprising an inner channel member 72 and outer housing member 74. Outer housing 74 includes a base 77 having oppositely disposed outer raised ends 78 adjacent the lateral edges of the base, and a pair of oppositely disposed side walls 39 extending outwardly from the longitudinal edges of the base. Accordingly, a seat is provided for inner channel member 72 as will be described in more detail below. A pair of flanges 70 that extend outwardly from each end of both side walls 39, and present an upper surface 71 that provide a support location 71 which, as will be described in more detail below, mechanically interfere with the damper arms 34 and 36. Thus, support location 71 supports the arms in their open position during normal operation of the damper assembly 20 against the biasing force of springs 40. Housing 74 further includes a centrally disposed hole 76 extending through the base 77.

Inner channel member 72 comprises a base 80 and a pair of side walls 82 extending upwardly from the base's longitudinal edges, though it should be appreciated that even one side wall would increase the strength of member 72. The distance between the outer surfaces of side walls 82 is slightly less than the distance between the inner surfaces of side walls 39, while the length of base 80 is slightly less than the length between raised ends 78. Accordingly, the base 80 of inner channel 72 is sized to fit onto the seat formed by the base 77 of housing 74. A threaded hub 64 extends downwardly through base 80 and is axially aligned with hole 76 when the channel member 72 is attached to base 77. In particular, because the diameter of hole 76 is greater than the outer diameter of hub 64, hub 64 extends through hole 76 and is configured to receive the threads of screw 56. In accordance with the preferred embodiment, the outer surface of base 80 is soldered to the upper surface of base 77 at joint locations 79, as illustrated in FIG. 7. It should be appreciated that the joint locations are disposed at the interface between base 80 and base 77, and additionally at the interface between side walls 82 and side walls 39.

The threaded portion of axially extending screw 56 is then inserted into hub 64 to connect the fusible link assembly 38 to the mounting bracket 44, it being appreciated that the outer housing 74 is connected to the screw only via inner channel 72. Fusible link assembly 38 may thus be lowered and raised with respect to bracket 44 by rotating screw 56 in the clockwise and counterclockwise directions, respectively. Bracket 44 includes a first and second pair of aligned apertures 68 that extend through side wall 45 and that are sized to receive the terminal ends 66 of arms 34 and 36. Specifically, the fusible link assembly 38 is lowered such that side walls 39 and 82 are disposed below apertures 68. The arms 34 and 36, which comprise spring steel wire in accordance with the preferred embodiment, are then flexed inwardly to enable terminal ends 66 to be inserted into those apertures that are situated on the same side of bracket 44 as the corresponding arm. The apertures thus form a pair of pivot locations that allow each arm 34 and 36 to rotate with respect to the bracket 44.

Each arm includes a pair of lower members 37 that extend angularly outwardly from each terminal end 66 and that are integrally connected to a corresponding pair of upper members 41. When the damper is in its open position, upper members 41 extend substantially axially, and are connected to each other by a distal end 43. Once the arms are installed into bracket 44, the lower members 37 are axially aligned with flanges 70 of fusible link assembly 38. Accordingly, as the assembly 38 is raised with the arms 34 and 36 installed, flanges 70 contact the lower member 37 at support location 71 and provide a mechanical interference that supports the arms in their upright position against the biasing force of springs 40, as illustrated further in FIGS. 4 and 7. The axial length "L1" of arms 34 and 36 between terminal and distal ends 66 and 43, respectively, is $2^{13}/_{16}$ inches in the axial direction, whereas the radial length "L2" between the terminal and distal ends is $2^{15}/_{16}$ inches in the radial direction.

When the temperature of the ambient environment of damper assembly 20 reaches a predetermined threshold, such as in the case of a fire, the solder-joining the inner channel 72 and housing 74 will melt. In accordance with the preferred embodiment, common melting points of solder are approximately 165° F. or 212° F., though it is easily appreciated that any alternative solder having an appropriate melting point may be selected for a given application.

Referring now to FIGS. 5 and 8, once the damper assembly 20 experiences a predetermined temperature elevation, joint locations 79 melt, causing the outer housing 74 to separate from inner channel 72. Because the diameter 76 of hole is greater than the outer diameter of the threaded portion of screw 56, the housing 74 slides axially along the screw towards base 52 of bracket 44 in the direction of Arrow A. Accordingly, the support locations 71 are also lowered, thereby removing the mechanical interference between outer housing 74 and arms 34 and 36 that maintain the arms in their open position. As a result, the force of springs 40 acting on damper blades 30 and 32 biases the blades outwardly in the direction of Arrow B (shown in FIG. 6) until the blades form a seal with flange 28 of annular frame. If the screw 56 extends axially upwardly when the damper assembly 20 is installed, the force of gravity will also bias the damper blades 30 and 32 toward their closed positions. Because the hub is threadedly connected to screw 56, the inner channel 72 does not translate in the axial direction when the fusible link fails.

Referring once again to FIG. 4, during operation, and particularly when the damper assembly 20 is open, several forces act on the damper arms 34 and 36 as well as the fusible link assembly 38. For example, the forces of springs 40 (and possibly gravity) that bias the blades 30 and 32 towards their closed position is counteracted by arms 34 and 36 that are locked in place via flanges 70. In particular, the stress incurred by the arms is, in part, a function of the radial distance "D1," and axial distance "D2," and lateral distance "D3" (shown in FIG. 4) between pivot location 68 and support location 71. The lateral distance D3 is fixed regardless of the position of damper blades 30 and 32. In prior art damper assemblies, D3 is set at ¼ inch, which has been found to produce excessive stresses on the fusible link assembly 38 and arms 34 and 36, which may result in breakage of the arms and premature failure of the fusible link and assembly 20. Accordingly, the flanges 70 have been constructed to produce an axial distance D3 between the pivot location 68 and support location 71 of ½ inch in accordance with the preferred embodiment. This produces a radial distance D1 of ⅝ inch when the damper assembly 20 is open as illustrated in FIG. 4, and ¾ inch when the damper assembly is fully closed as illustrated in FIG. 5. The axial distance axial distance "D2" is ⅜ when the damper assembly is open, and $^{15}/_{32}$ when closed. This increase in distance reduces the forces acting on fusible link assembly 38 and on the damper arms 34 and 36 when compared to prior designs, as will now be illustrated with reference to FIG. 9.

It should be appreciated that while these distances have been set forth in accordance with the preferred embodiment, they may vary slightly due to tolerances in manufacturing. Furthermore, D1 and D2 will vary depending on the orientation of damper blades 30 and 32 when open and closed. For example, while it is preferred for the blades to be vertically disposed when open, and horizontally disposed when closed, as illustrated, it is envisioned that they may operated slightly off-vertical and off-horizontal. Such minor changes in dimensions D1, D2, and D3 may thus be made while achieving the advantages of the preferred embodiment, and thus are within the scope of the present invention, as will be described in more detail below.

Referring now to FIG. 9, one advantage of the present invention is schematically illustrated. In particular, a damper arm is schematically illustrated having a first downward force F1 acting on the distal end 43 representing the spring (and gravity) force, a second downward force F3 acting on the terminal end 66 at the pivot location 68, and an upward force F2 acting at the support location 71, such that (1) F1+F3=F2. The support location 71 is spaced a first distance X1 from the distal end 43, and a second distance X2 from the pivot location 68. The static equation representing the arm at equilibrium is F3*X2 =F1*X1, or alternatively (2) F3=F1*X1/X2. Because F3=F2−F1, equation (2) may be rewritten as (3) F2−F1=F1*X1/X2, or (4) F2=F1+F1*X1/X2. Therefore, as X2 increases, F2 decreases. Additionally, because F3=F2−F1, F3 also decreases as F2 decreases under a constant F1. Accordingly, moving the support location 71 outwardly with respect to terminal end 66 reduces the stress experienced by the arm. It is thus mathematically proven that increasing D3 from ¼ inch to ½ inch (thus increasing X2) reduces the amount of force imparted onto both the damper arms and the outer housing at support location 71. Consequently, premature failure of the damper assembly 20 is reduced.

It should be further appreciated that D3 (and D1) may be increased independent of D2 by adjusting the distance between flanges 70 along the longitudinal direction of side walls 39. While D3 equals ½ inch in accordance with the preferred embodiment, any distance D3 that is greater than ¼ has been found to improve the durability of the damper assembly 20 over conventional designs. In accordance with the preferred embodiment, D3 could be set at approximately ⅜ inch, ⅝ inch, ¾ inch, ⅞ inch, or any distance in ⅛ inch increments up to the length of lower member 37, which is approximately 1⅛ inch in accordance with the preferred embodiment. "Approximately" as used herein, and "substantially" as used in the appended claims, includes all distances within ⅛ inch tolerance. It should further be appreciated that flanges 70 could be designed to achieve a distance D2 greater than 3/8, and up to the length of lower member 37, when the damper assembly 20 is open. In accordance with the preferred embodiment, the length of lower member 37 is approximately 1 1/8 inches.

As discussed above with reference to FIG. 9, F2 therefore equals F1+F1*X1/X2, and acts on flanges 70. This correspondingly imparts a corresponding force on the solder joining outer housing 74 to inner channel 72, especially in prior art designs, where D3 is 1/4 inch. As a result, it has been found in previous designs that implement a flat retainer plate instead of a channel member such as channel 72, that the joint formed by the solder may, in some circumstances, be unable to withstand the forces produced during normal operation of the damper assembly. In particular, it has been found that the flat plate tends to bow outwardly, thereby increasing the probability that the solder joint will crack, thus resulting in premature failure of the fusible link assembly. The preferred embodiment of the present invention reduces likelihood of this type of failure. First, it reduces the force F2 by increasing X1 with respect to X2, as described above.

Secondly, side walls 82 are integrally connected to the base 80 of inner channel 72 and extend along the same direction as the force exerted on damper arms 34 and 36 while in the normally open position. These side walls have been found to increase the resistance of base 80 to bending as the result of the forces produced at support location 71. Furthermore, the strength of the fusible joint is increased in accordance with the preferred embodiment by soldering the side walls 82 to side walls 39, thus increasing the surface area of the joint. This increases the strength of the fusible link without adversely affecting the operation of damper assembly 20, as all solder will fail at the predetermined temperature, as described above.

The damper assembly 20 thus constructed in accordance with the preferred embodiment adds strength to damper arms 34 and 36 as well as fusible link assembly 38, thereby increasing the overall reliability of the damper assembly 20.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

I claim:

1. A damper assembly having at least one damper blade operating between an open and closed position to control fluid flow through a conduit, the damper assembly comprising:
   (a) a bracket defining a base and a first and second oppositely disposed side walls extending upwardly therefrom;
   (b) a damper arm supporting the at least one damper blade and having terminal ends connected to the side walls at a pivot location, wherein the arm is operable to rotate about the pivot location between an open and a closed position; and
   (c) a fusible link assembly coupled to the bracket, the fusible link assembly including;
      (1) a housing member defining a support structure that engages the damper arm at a support location and interferes with the rotation of the damper arm; and
      (2) a channel member removably fused to the housing member via a solder material, the channel member including a base and first and second side walls extending upwardly therefrom, wherein the channel member separates from the housing member when the solder reaches a predetermined temperature; and
   wherein the interference between the support location and the damper arm is removed when the channel member separates from the housing member to allow the damper arm to pivot about the pivot location and close the at least one damper blade.

2. The damper assembly as recited in claim 1, wherein solder is disposed at an interface between the housing member and at least one of the first and second side walls of the channel member.

3. The damper assembly as recited in claim 2, wherein the solder is operable to release the channel member from the housing member at the predetermined temperature.

4. The damper assembly as recited in claim 1, wherein the pivot location and support location define a lateral distance therebetween greater than 1/4 inch.

5. The damper assembly as recited in claim 4, wherein the lateral distance is substantially 1/2 inch.

6. The damper assembly as recited in claim 1, wherein the pivot location and support location define a radial distance therebetween at least 5/8 inch when the damper assembly is open.

7. The damper assembly as recited in claim 1, wherein the pivot location and support location define a radial distance therebetween at least 3/4 inch when the damper is closed.

8. The damper assembly as recited in claim 1, wherein the pivot location and support location define an axial distance therebetween at least 3/8 inch when the damper assembly is open.

9. The damper assembly as recited in claim 1, wherein the pivot location and support location define an axial distance therebetween at least 15/32 inch when the damper assembly is closed.

10. A damper assembly having a damper blade operable between and open and closed position to control fluid flow through a conduit, the damper assembly comprising:
   (a) a bracket defining a base and a first and second oppositely disposed side walls extending upwardly therefrom;
   (b) a damper arm supporting the damper blade and having terminal ends connected to the side walls at a pivot location, wherein the arm is operable to rotate about the pivot location; and
   (c) a fusible link assembly coupled to the bracket and engaging the arm at a support location, the fusible link assembly including a housing member coupled to a channel member via a solder material, wherein channel member comprises a base and at least one side wall extending outwardly therefrom, and wherein the housing member and channel member separate when the solder reaches a predetermined temperature to remove the engagement between the solder and damper arm to permit the arm to rotate about the pivot location and close the damper blade.

11. The damper assembly as recited in claim 10, wherein the support location and pivot location define an lateral distance therebetween of greater than 1/4 inch.

12. A damper assembly having at least one damper blade operating between an open and closed position to control fluid flow through a conduit, the damper assembly comprising:
   (a) a bracket defining a base and a first and second oppositely disposed side walls extending upwardly therefrom, wherein the side walls define apertures therein;

(b) at least one damper arm supporting the damper blade and having terminal ends received within the apertures to define a pivot location, wherein the arm is operable to rotate about the pivot location between an open and a closed position; and (c) a fusible link assembly coupled to the bracket including a flange that engages the arm at a support location, the fusible link assembly including a housing member coupled to a support member via a solder material, wherein the housing member and support member separate in an axial direction when the solder reaches a predetermined temperature to remove the engagement between the fusible link assembly and the arm and to permit the arm to rotate about the pivot location and close the damper blade;

wherein the flange is configured to produce a lateral distance between the support location and the pivot location greater than ¼ inch.

13. A damper assembly having at least one damper blade operating between an open and closed position to control fluid flow through a conduit, the damper assembly comprising:

(a) a bracket defining a base and a first and second oppositely disposed side walls extending upwardly therefrom, wherein the side walls define apertures therein;

(b) at least one damper arm supporting the damper blade and having terminal ends received within the apertures to define a pivot location, wherein the arm is operable to rotate about the pivot location between an open and a closed position; and (c) a fusible link assembly coupled to the bracket including a flange that engages the arm at a support location, the fusible link assembly including a housing member coupled to a support member via a solder material, wherein the housing member and support member separate in an axial direction when the solder reaches a predetermined temperature to remove the engagement between the fusible link assembly and the arm and to permit the arm to rotate about the pivot location and close the damper blade;

wherein the flange is configured to produce a radial distance between the support location and the pivot location of at least substantially ⅝ inch when the damper assembly is open.

14. A damper assembly having at least one damper blade operating between an open and closed position to control fluid flow through a conduit, the damper assembly comprising:

(a) a bracket defining a base and a first and second oppositely disposed side walls extending upwardly therefrom, wherein the side walls define apertures therein;

(b) at least one damper arm supporting the damper blade and having terminal ends received within the apertures to define a pivot location, wherein the arm is operable to rotate about the pivot location between an open and a closed position; and (c) a fusible link assembly coupled to the bracket including a flange that engages the arm at a support location, the fusible link assembly including a housing member coupled to a support member via a solder material, wherein the housing member and support member separate in an axial direction when the solder reaches a predetermined temperature to remove the engagement between the fusible link assembly and the arm and to permit the arm to rotate about the pivot location and close the damper blade;

wherein the flange is configured to produce an axial distance between the support location and the pivot location of at least substantially ⅜ inch when the damper assembly is open.

15. The damper assembly as recited in claim 12, wherein the lateral distance is substantially ½ inch.

16. The damper assembly as recited in claim 12, wherein the lateral distance is between ¼ inch and 1⅛ inch.

17. The damper assembly as recited in claim 12, wherein the lateral distance is no greater than the length of the damper arm.

18. The damper assembly as recited in claim 13, wherein the radial distance is at least substantially ¾ inch when the damper assembly is closed.

19. The damper assembly as recited in claim 14, wherein the axial distance is at least substantially 15/32 inch when the damper assembly is closed.

20. The damper assembly as recited in claim 12, wherein the flange is configured to produce a radial distance between the support location and the pivot location of at least substantially ⅝ inch when the damper assembly is open.

21. The damper assembly as recited in claim 12, wherein the flange is configured to produce an axial distance between the support location and the pivot location of at least substantially ⅜ inch when the damper assembly is open.

22. The damper assembly as recited in claim 13, wherein the flange is configured to produce an axial distance between the support location and the pivot location of at least substantially ⅜ inch when the damper assembly is open.

23. The damper assembly as recited in claim 22, wherein the flange is configured to produce a lateral distance between the support location and the pivot location greater than ¼ inch.

* * * * *